UNITED STATES PATENT OFFICE.

OSCAR BERNHEIMER, OF VIENNA, AUSTRIA-HUNGARY.

DISINFECTING COMPOSITION.

989,322.

Specification of Letters Patent. Patented Apr. 11, 1911.

No Drawing. Application filed October 12, 1908. Serial No. 457,381.

*To all whom it may concern:*

Be it known that I, OSCAR BERNHEIMER, subject of the Emperor of Austria-Hungary, residing at Vienna, Austria-Hungary, have invented certain new and useful Improvements in Disinfecting Compositions, of which the following is a specification.

The present invention has for its object to provide an improved, efficient and relatively inexpensive microbicide or disinfecting agent and also a process of producing the same, the character of the microbicide being such that it can be prepared and used conveniently and will act quickly and with certainty in destroying fungi, bacteria, pathogenic and other microbicide organisms, it consisting of a compound of bisulfate of soda and sodium borofluorid, the compound possessing greater antiseptic properties than those of corresponding quantities of the two ingredients when used separately.

The following is given as an example of a microbicide prepared in accordance with the present invention: Equi-molecular quantities of sodium borofluorid and bisulfate of soda, that is to say, 110 parts per weight of the first named combination and 120 parts per weight of the latter combination are mixed in a dry condition and an aqueous solution of this mixture is prepared of a degree of concentration which may vary according to the purposes for which the microbicidal agent is to be used.

In using a microbicide produced in accordance with the present invention the aqueous solution may be applied for instance in places where fermentation takes place. For example, it may be used for the purpose of washing out and rinsing vats, tuns or wooden cisterns, store casks or vats, tubes or hose, beer conduits and, in fact, it may be used for cleansing apparatus of various kinds. The microbicide, moreover, may be used for washing filtering masses, as a coating for the walls of working rooms, for washing floors or for disinfecting drains and conduits of various kinds.

For disinfecting articles to protect them from pathogenic germs, the microbicide may be prepared as above described and applied in the usual manner, the microbicide in the form of an aqueous solution being used for washing and rinsing the objects and surfaces that are to be disinfected. The microbicide is particularly adapted for use as a disinfectant for the washing of the sick and the clothes during washing may be kept in the solution.

The degree of concentration of the solution will vary according to the particular uses to which it is to be applied. For most purposes a solution of from one to two per cent. will be sufficient, while in those cases where the microbicide is to be used, for instance as a disinfecting coating for the walls of establishments where fermentation takes place, it may be best to employ a solution of about ten per cent.

Practice has demonstrated that a microbicide composed of a compound of bisulfate of soda and sodium borofluorid possesses greater antiseptic or microbicidal properties than corresponding quantites of bisulfate of soda and sodium borofluorid when used separately. The increased efficiency of the compound of these two ingredients seems to be due to a chemical reaction which occurs from the mixing of the ingredients and is probably due to the formation of salts of complex acids containing fluorin or boron and fluorin, as experiments would indicate that no combinations of boron or fluorin escape even when the solution is evaporated in a water-bath to the consistency of thick syrup.

I claim as my invention:

A microbicide composed of bisulfate of soda and sodium borofluorid.

In testimony whereof I have hereunto set my hand in presence of two subscribing witnesses.

OSCAR BERNHEIMER.

Witnesses:
JOSEF RUBASCH,
ROBERT W. HEINGARTNER.